United States Patent
Brock et al.

[11] 3,778,601
[45] Dec. 11, 1973

[54] AUTOMATIC TRACK INSERTION AND DISPLAY

[75] Inventors: Larry D. Brock, Collinsville; John E. Games, Granby, both of Conn.

[73] Assignee: United Aircraft Corporation, East Hartford, Conn.

[22] Filed: July 3, 1972

[21] Appl. No.: 268,252

[52] U.S. Cl....... 235/150.27, 235/150.26, 235/186, 343/112 D
[51] Int. Cl. .................. G06g 7/22, G06g 7/78
[58] Field of Search............. 235/150.2, 150.26, 235/150.27, 186; 343/106 R, 107, 112 C, 343/112 D; 244/77 B

[56] References Cited
UNITED STATES PATENTS

| | | | |
|---|---|---|---|
| 3,659,291 | 4/1972 | Anthony | 343/106 R X |
| 3,671,728 | 6/1972 | Day et al. | 235/186 X |
| 3,406,280 | 10/1968 | Vago | 235/150.27 |
| 3,118,059 | 1/1964 | Vago | 235/150.26 |
| 3,621,212 | 11/1971 | Hobbs et al. | 235/150.27 |
| 3,581,073 | 5/1971 | Visher | 235/150.26 |
| 3,534,399 | 10/1970 | Hirsch | 235/150.27 |
| 3,464,016 | 8/1969 | Kerwin et al. | 235/186 X |
| 3,691,356 | 9/1972 | Miller | 235/150.22 |

*Primary Examiner*—Malcolm A. Morrison
*Assistant Examiner*—Jerry Smith
*Attorney*—Melvin Pearson Williams

[57] ABSTRACT

Digital values of designated track angles for various portions of a preplanned flight are presented by a storage unit for different segments of the flight plan. These values are converted to quadrature square waves of a phase related to the designated track angle, which are used to synchronously demodulate sinusoidal signals of X and Y coordinates from the aircraft to a way point relating to the flight plan segment, the result being combined to provide along-track distance to way point and cross track error. The square wave signals may be used to drive a conventional differential resolver so as to automatically adjust the resolver to the designated track angle to provide an indication thereof; alternatively, a digital display of the stored value may be used.

4 Claims, 6 Drawing Figures

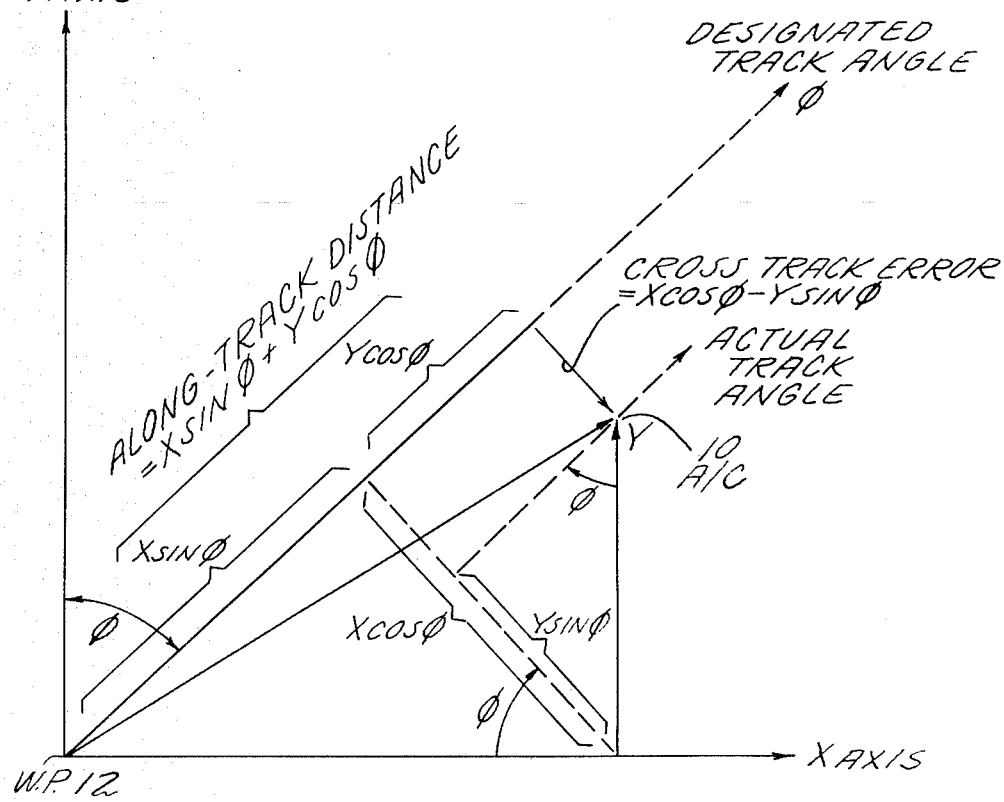
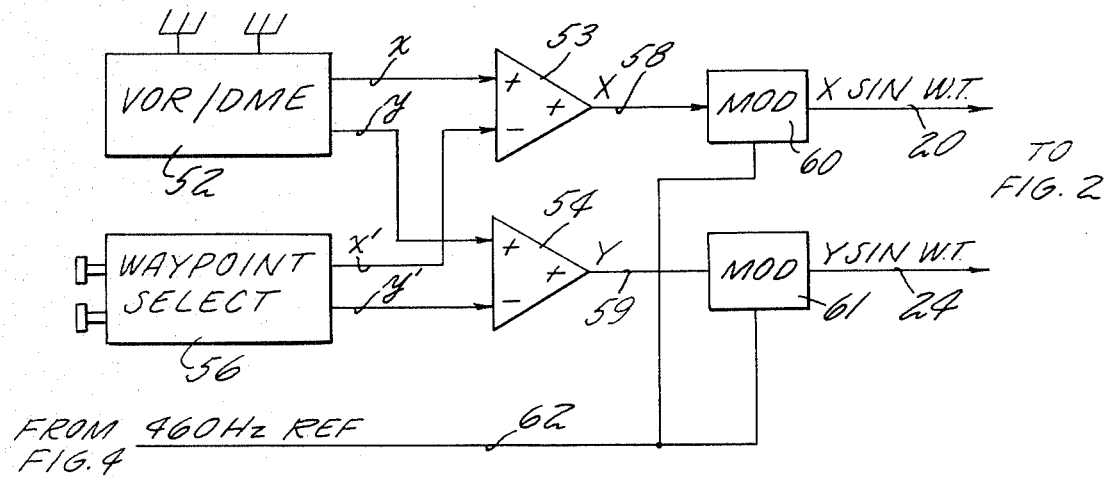

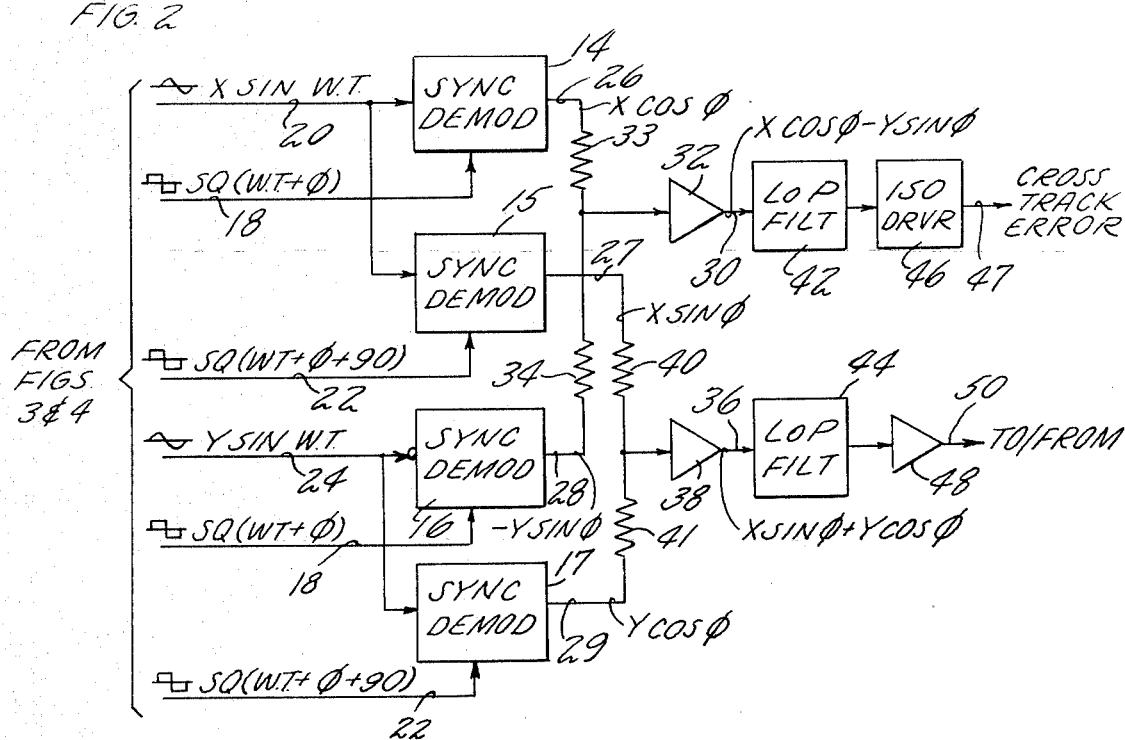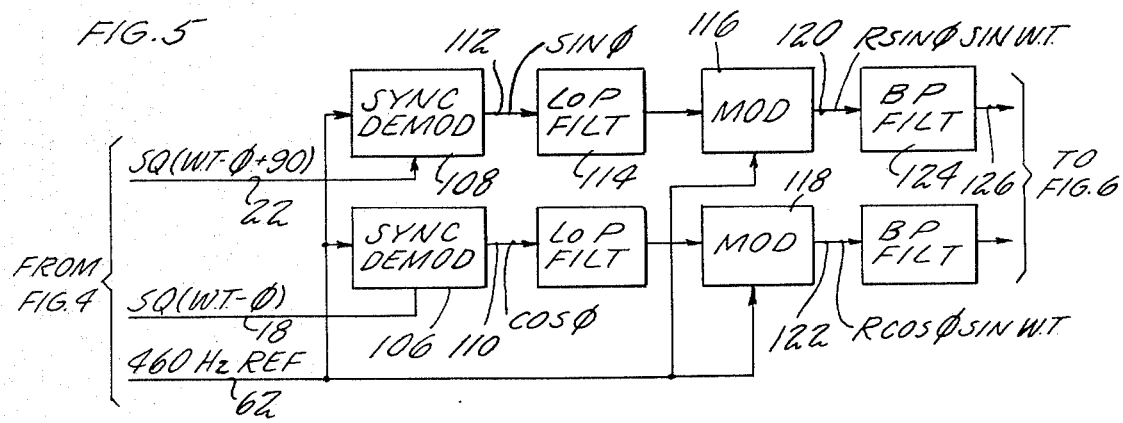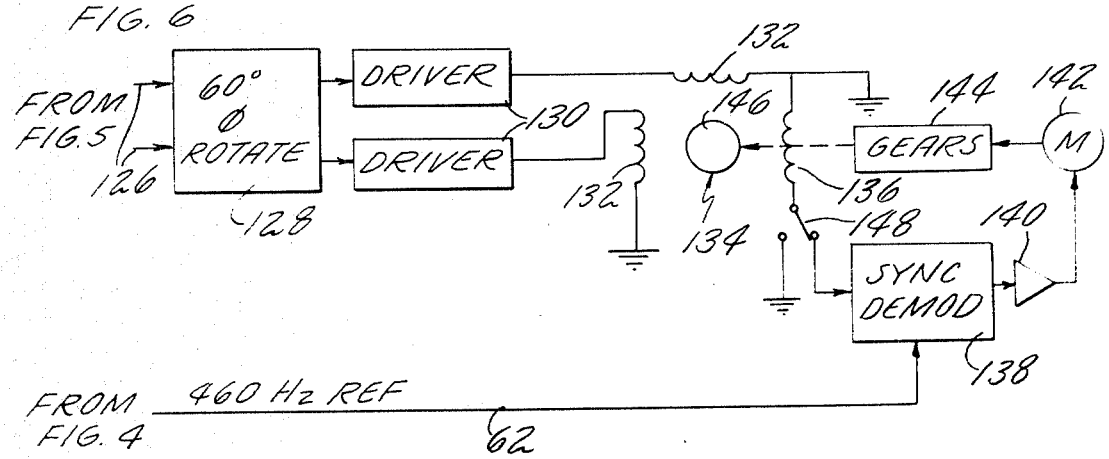

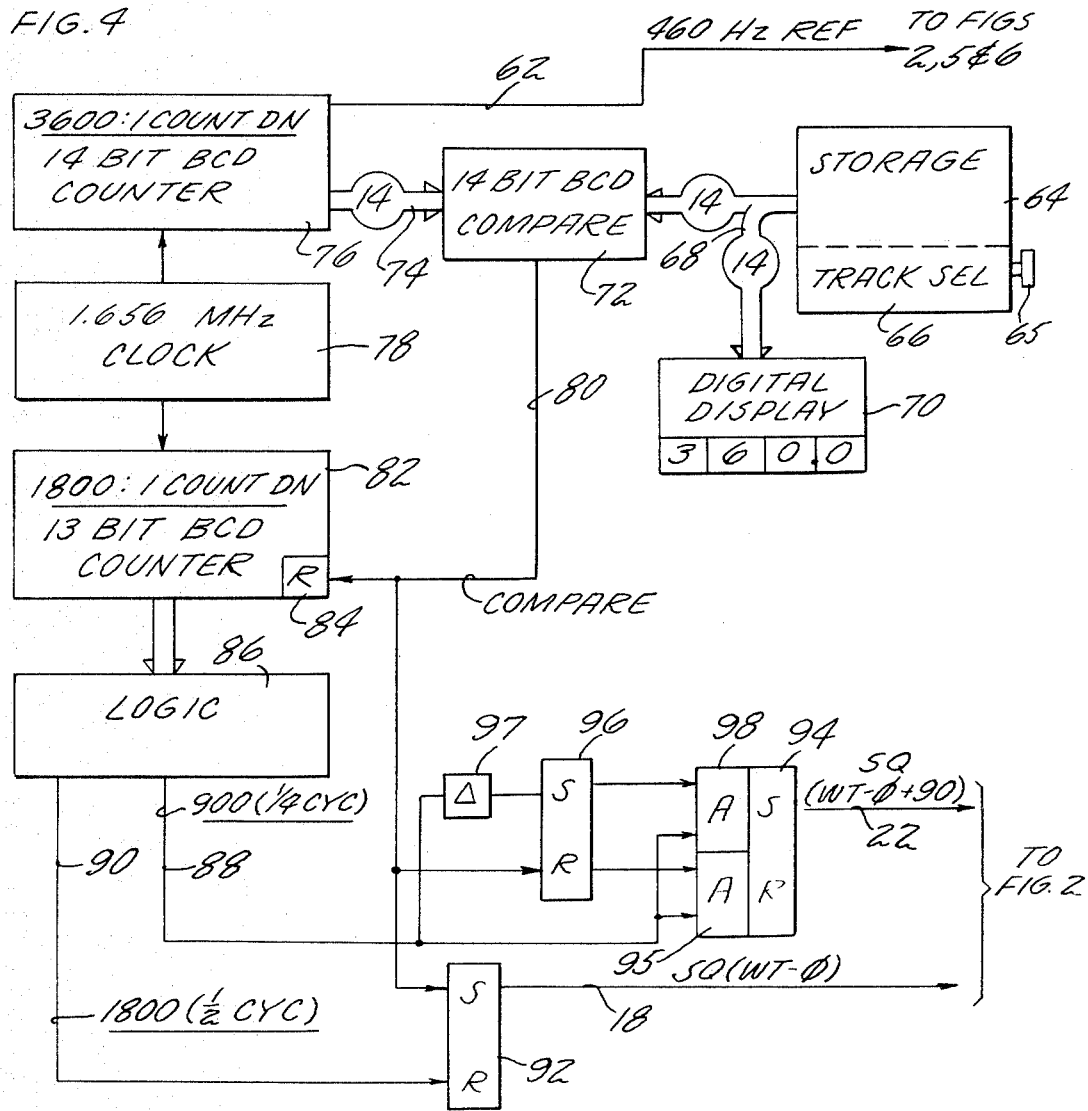

AUTOMATIC TRACK INSERTION AND DISPLAY

BACKGROUND OF THE INVENTION

1. Field of the Invention

This invention relates to aircraft navigation computers, and more particularly to an aircraft track computer.

2. Description of the Prior Art

Navigation of aircraft in response to indications (or command signals to an automatic pilot) from navigation equipment is well known. One of the parameters which such equipment has been known to provide is the cross track error; another is a to-from indication to determine whether the aircraft is flying toward the way point or away from it. Typically, a way point is selected in response to manual controls which provide signals indicative of the coordinates of the way point with respect to the location of a known VOR/DME ground station. These signals are combined with the coordinates to the ground station as provided by the VOR/DME receiver and coordinate conversion equipment on board the aircraft so as to provide coordinates from the aircraft to the selected way point. These signals are then used to feed a differential resolver, the rotor of which is adjusted to the selected track angle by the pilot in response to charts or tables indicative of the current segment of a preplanned flight.

It has been found that the setting of the resolver rotor to the desired track angle is subject to relatively high error; for instance, at a hundred miles distance from a way point, an error of 1 ½° in the manual setting of the track angle can result in a 2.6 mile cross track error. Additionally, the manual setting-in of the coordinates and track angle comprises manual workload for the pilot.

SUMMARY OF THE INVENTION

A primary object of the present invention is to provide more accurate track angle designation in an aircraft navigation track computer.

Another object of the present invention is to provide a track computer which reduces pilot workload.

According to a first aspect of the present invention, a designated track angle relating to a selected way point is represented by digital indications which are combined, in an electronic computational means, for signals representative of said selected way point to accurately compute cross track error; further the electronic computational means provides a to-from indication from the sense of the along-track distance of the aircraft to the selected way point.

According further to this aspect of the invention, a designated track angle is represented by signals, the phase of which are proportional to the designated track angle, and these signals are combined with signals representative of the coordinates of the aircraft with respect to the corresponding selected way point so as to provide signals relating to cross track errors and for operating the to-from flag. More specifically, the invention provides quadrature square wave signals the phase of which is representative of the designated track angle, which signals are utilized to synchronously demodulate sinusoidal signals representative of the X and Y coordinates of the aircraft with respect to the way point.

In accordance with another aspect of the present invention, signals representing designated track angles are automatically provided, for each segment of a preplanned, prestored flight by a storage means.

Since the present invention avoids the need of reliance upon a differential resolver to provide signals for determining cross track error and to-from indications, the differential resolver may be eliminated entirely if desired; the storage unit instead providing a digital display of the designated track angle. On the other hand, the present invention utilizes the signals representative of the designated track angle to drive a differential resolver so as to automatically set it to the designated track angle thereby to provide an indication for the pilot.

The invention achieves great accuracy since it does not rely on human intervention in producing the signals utilized for the computation of cross track error, or of the to-from indication, but rather provides an accurate preflight insertion of desired track angles. It further reduces pilot workload and permits smoother transitions from one segment of a preplanned flight to another. The invention uses electronic computational means, thus avoiding reliance on electro-mechanical resolvers. The invention is easily implemented with low cost and reliable components readily available in the art. The invention may be implemented, in its broadest sense, with digital computational means, if desired.

Other objects, features and advantages of the present invention will become more apparent in the light of the following detailed description of preferred embodiments thereof, as illustrated in the accompanying drawing.

BRIEF DESCRIPTION OF THE DRAWING

FIG. 1 is a diagram illustrative of the trigonometric relations between way point coordinates and track angle;

FIG. 2 is a schematic block diagram of demodulating and combining circuitry suitable for use in the present invention;

FIG. 3 is a schematic diagram of known apparatus for providing signals representing aircraft X, Y coordinates to a selected way point;

FIG. 4 is a simplified schematic block diagram of apparatus responsive to stored, designated track angle signals to produce square wave signals having a phase relationship to the designated track angle for use in an embodiment of the present invention;

FIG. 5 is a circuit for generating signals for driving the resolver to provide an indication of designated track angle; and FIG. 6 is a schematic diagram of circuitry for driving a resolver to provide a designated track angle indication in accordance with the present invention.

DESCRIPTION OF THE PREFERRED EMBODIMENT

Referring now to FIG. 1 an aircraft is assumed to be at a position 10 having X and Y coordinates in a cartesian coordinate system, the origin of which is located at a selected way point 12. Associated with the way point 12 for a given segment of a preplanned flight is a designated track angle $\phi$. A cross track error results when the actual track angle of the aircraft is different than the designated track angle. The cross track error (C.T.E.) can be computed from trigonometric relationships as $$C.T.E. = X \cos \phi - Y \sin \phi \qquad (1)$$

Similarly, the along-track distance (A.T.D.) can be computed as $$\text{A.T.D.} = X \sin \phi + Y \cos \phi \quad (2)$$

This is achieved, in one embodiment of the invention, as illustrated in FIG. 2. Therein, a plurality of synchronous demodulators 14–17 utilize square wave signals, the phase of which is a function of the designated track angle, to synchronously demodulate, in various combinations, sinusoidal signals representing the X and Y coordinates of the aircraft with reference to the selected way point. Specifically, the synchronous demodulator 14 has at its reference phase input a 460 Hz square wave signal on a line 18 which is delayed in phase by $\phi$ fron sin wt, to synchronously demodulate a signal on a line 20 equal to X sin wt. The synchronous demodulator 15 utilizes at its reference phase input a signal on a line 22 delayed in phase by $\phi$ from cos wt, to synchronously demodulate the signal on the line 20. The synchronous demodulator 16 utilizes at its reference phase input a signal on a line 22 to synchronously demodulate a signal on a line 24 equal inverted to Y sin wt, and the synchronous demodulator 17 utilizes the signal on the line 18 to synchronously demodulate the signal on the line 24. The output of the synchronous demodulator 14 on the line 26 is equal to X cos $\phi$; the output of the synchronous demodulator 15 on the line 27 is equal to X sin $\phi$; the output of the synchronous demodulator 16 on the line 28 is equal to $-Y \sin \phi$; and the output of the synchronous demodulator 17 on the line 29 is equal to Y cos $\phi$. A signal equal to X cos $\phi - Y \sin \phi$ is developed on a line 30 by an amplifier 32 having a pair of input summing resistors 33, 34 to which the signals on the lines 26 and 28 are applied. A signal equal to X sin $\phi$ + Y cos $\phi$ is provided on a line 36 by an amplifier 38 having input summing resistors 40, 41 to which signals on the lines 27 and 29 are applied.

By comparison with FIG. 1, it is seen that the signal an the line 36 comprises the cross track error and the signal on the line 30 comprises the along-track distance.

Signals on the lines 30, 36 are passed through respective low pass filters 42, 44 which may be on the order of 2 to 10 Hz; these filters eliminate the reference frequency (wt) ripple in the output to form a substantially DC signal proportional to cross track error and along-track distance, respectively. The output of the filter 42 may be applied to an isolated driver 46, if desired for driving an isolated cross track error indicator of the type known in the art with a cross track signal on a line 47, and the output of the filter 44 may be applied to a polarity sensing circuit 48, which in turn may comprise either a low threshold high gain amplifier or a comparator referenced to ground, so as to provide the to-from signal on a line 50, the polarity of which is always related to the polarity of the along-track distance to or from the way point as the case may be.

The circuit of FIG. 2 is illustrative of a primary aspect of the present invention; that is, providing highly accurate cross track error and to-from indications electronically, eliminating reliance upon the manual setting of a differential resolver. The source of the signals may vary in any given implementation of the present invention. illustrates FIG. 3 ILLUSTRATES a source of signals representative of the X and Y coordinates of the aircraft with reference to the way point, of a type that is known in the art. Therein, a VOR/DME airborne receiver and coordinate converter 52 provides $x$ and $y$ signals to respective differencing circuits 53, 54 which also receives $x'$ and $y'$ signals from a manually adjusted way point selecting apparatus 56. The output of the differencing circuits on respective lines 58, 59 comprise signals proportional to the X and Y coordinates, respectively, of the aircraft with respect to the selected way point. In some embodiments, these signals may be AC signals and may therefore be applied directly to FIG. 2. In other embodiments, these signals may comprise DC signals and would therefore require modulation before utilization in FIG. 2. For this purpose, a pair of modulators 60, 61 each utilize a 460 Hz reference signal on a line 62 at the respective reference phase inputs thereto to provide sinusoidal signals on the lines 20, 24 for application to the circuit of FIG. 2. In this embodiment, the 460 Hz reference is a square wave developed in FIG. 4; the modulators 60, 61 may comprise choppers feeding 460 Hz band pass filters.

In accordance with another aspect of the invention, the square wave signals having phases relating to the designated track angle on the lines 18 and 22 in FIG. 2 are derived as illustrated in FIG. 4, wherein a storage device 64 has stored therein, in BCD code, values of a plurality of track angles, each designated for a particular segment of a preplanned flight, each corresponding to a predesignated way point relating to the same flight segment. Through any suitable manual input means 65 the track select mechanism 66 associated with the storage device will cause the storage device 64 to provide on a trunk of 14 output lines 68 signals representing the designated track angle value. The storage device 64 may simply comprise a random access memory, having a suitable switch to provide inputs thereto which automatically decode to the prestored output value. Other addressable storage devices known in the art may be used as desired. The designated track values on the trunk of lines 68 may be presented to a digital display device 70 which will display the value in degrees and tenths of a degree from 000.0° to 360.0°. Since 360.0° represents tenths, units, and tens, and only values of zero to three in the hundreds column, the BCD code requires four bits each for the three lowest orders but only two bits for the highest order, since values of zero to three can be represented with two binary bits. This limits the required word size to fourteen bits. The signals on the trunk of lines 68 are also applied to a 14 bit BCD compare circuit 72 which also receives signals on another trunk of 14 lines 74 from a 14 bit BCD counter 76 which is advanced by signals from a suitable clock 78. If the clock 78 operates at 1.656 MHz, the 3600:1 count-down by the counter 76 provides the 460 Hz reference on the line 62. The stages of the counter 76 should be arranged to count from 000.0 up to 360.0 and return to 000.0 in a closed-ring fashion; the 000.0 count equals zero phase in the period of the 460 Hz reference. It is within this cycle that the phase of the square wave signals are generated to relate to the designated track angle. The compare circuit 72 will issue a signal at the time that the counter 76 presents signals on the lines 74 having the same value as the signals on the lines 68. For a small angle, this will occur at a very low count, and therefore early in the period; for larger angles, a larger count will be required so that the compare circuit will provide a signal on the line 80 later in the period. Thus the signal on the line 80 may vary in phase from 0° to 360° with respect to the start of the period (as is defined by the 000.0 setting of the counter 76). The clock 78 also drives a 13 bit BCD counter 82 which is adjusted to count from 000.0 to 180.0, and return to 000.0 and continue counting in a closed-ring fashion. However the counter 82 is provided with a forced reset input 84 which responds to a signal on the line 80 to reset the counter 82 to an all zeros condition. The output of the counter 82 is decoded by suitable logic 86 so as to provide a first output signal when the count has reached 900 and again to provide a signal on a line 90 when the count reaches 1800. The signal on the line 88 therefore defines quarter periods and the signal on the line 90 defines half periods of the time between reset pulses. Thus each period starts with a compare signal on the line 80. The quarter period, comparable to 90° in phase lag, is defined by one signal on the line 88, the half period is defined by the signal on the line 90, and the three quarter period is also defined by the signal on the line 88. These signals are utilized to generate the two square wave signals on the lines 18 and 22 by controlling respective bistable circuits 92, 94. Specifically, a square wave signal which is in phase with the 460 Hz carrier (sin wt) except for a phase lag equal to the designated track angle setting is generated on a line 18 by the bistable 92 since it is set at the time of a comparison signal on the line 80 and is reset 1800 counts or one half cycle later by the signal on the line 90. On the other hand, the bistable 94 is set and reset in response to the quarter cycle signals on the line 88. To ensure that this provides a signal which is basically in phase with cos wt, except for the lag therefrom of the designated track angle $\phi$, an AND circuit 95 will operate in response to the signal on the line 88 only when another bistable 96 is reset. This is reset by the compare signal on the line 80. Thus, the bistable 94 is reset 90° after the bistable 92 is set. The ¼ cycle signal on line 88 is delayed (97) and sets the bistable 96; the next ¼ cycle signal (at 270°) will cause an AND circuit 98 to set the bistable 94. This assures that a phase relationship to the cosine, rather than to the inverse of the cosine, will result.

Although one aspect of the present invention relates to the provision of stored track angles and generation of signals for controlling the resolution of X and Y coordinates (of the aircraft with respect to a related way point) into cross track and along-track signals, it should be understood that generation of suitable signals for use in the embodiment of FIG. 2 may be made in other ways, if so desired, while utilizing the primary aspect of the present invention as illustrated in FIG. 2.

As described hereinbefore, if desired, the digital display 70 (FIG. 4) may be used as the sole indication to the pilot of his designated track heading. However, since numerous aircraft already have a differential resolver which pilots are accustomed to viewing for an indication of designated track angle, the present invention also provides for utilizing the signals on the lines 18 and 22 for driving the differential resolver simply to provide an indication; it should be understood that the resolver is not used to provide signals for resolving cross track error and along-track distance as described hereinbefore. Additionally, as is seen in a commonly-owned copending application of J. E. Games, Ser. No. 268,253 entitled TRUE DISTANCE TO WAY POINT AND OFFSET COMPUTER, filed on even date herewith, the differential resolver is not necessary to provide distance to way point. Thus the differential resolver, in accordance with this invention and the aforementioned copending invention, can be eliminated entirely or used simply as an indicator.

FIGS. 5 and 6 illustrate how the signals on the lines 18 and 22 may be utilized for this purpose. Specifically, the signals on the lines 18 and 22 are applied to the phase reference inputs of a pair of respective sychronous demodulators 106, 108 to synchronously demodulate the 460 Hz reference signal on the line 62. This provides signals on corresponding output lines 110, 112 which are equal to cos $\phi$ and sin $\phi$ respectively. These are passed through suitable low pass filters 114 and applied to modulators 116, 118 to develop signals on respective lines 120, 122 which are proportional to a reference voltage times sin $\phi$ sin wt and the reference voltage times cos $\phi$ sin wt, respectively. These may be passed through bandpass filters 124 to eliminate unwanted harmonics and thereafter applied on signal lines 126 to a 60° phase rotator 128 illustrated in FIG. 6. This provides suitably phased carrier signals which are phase modulated in a manner relating to the designated track angle $\phi$, which signals may be passed to a pair of drivers 130 for driving corresponding windings 132 of a differential resolver 134. One output winding 136 of the differential resolver may be used to derive a nulling output, which can be applied to the signal input of a synchronous demodulator 138, the phase reference of which is driven by the 460 Hz reference signal on the line 62. The output, after amplifiction in an amplifier 140, may drive a motor 142 which, through a gear train 144, will rotate the rotor 146 of the differential resolver 134 to a null, whereby the rotor 146 will point to the designated track angle and provide an indication thereof to the pilot. If desired, a switch 148 may be transferred to the position opposite to that shown in FIG. 6 so as to simply short out the winding 136; this may be done in the case where a differential resolver has enough inherent torque so as to null itself in response to eddy currents, making it possible to eliminate the use of the apparatus 138–144; in fact, in such a case, the switch 148 may be eliminated simply by grounding the related side of the winding 136.

Thus the aspects of the invention include generation of along track distance and cross track error electronically, without the use of a resolver, providing automatic designated track angle signals in response to storage, and providing means for driving an indicator to indicate the automatically designated track angle.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. A navigation computer comprising:
   means providing a first carrier signal X sin wt and a second carrier signal Y sin wt, the magnitudes of which are representative of X and Y coordinates of an aircraft with respect to a selected way point;

storage means presenting a selected one of a plurality of designated track angles in the form of a multibit group of digital signals;

a counter, the output of which is representative of track angles, said counter being advanced from a zero count to a count relating to maximum track angle during each cyclic period;

means comparing the output of said storage device with the output of said counter and for generating a signal when the outputs thereof are equal, and means responsive to said compare output signal for generating a first square wave signal at the same frequency as said carrier signal but delayed in phase from sin wt by a designated track angle $\phi$ corresponding to said selected way point, and a second square wave signal at the same frequency as said carrier signals but delayed from cos wt by said angle $\phi$;

means for combining said carrier signals with said first square wave signal to generate cross track error as $X \cos \phi - Y \sin \phi$; and means for combining said carrier signals with said second square wave signal to generate along-track distance as $X \sin \phi + Y \cos \phi$.

2. An aircraft navigation computer according to claim 1 wherein said square wave signal generating means includes further means responsive to said compare output signal for generating signals delayed one quarter period, one half period and three quarter periods therefrom for controlling said square wave signal generating means.

3. A navigation computer comprising:

means providing a pair of carrier signals the magnitudes of which are representative of orthogonal coordinates of an aircraft with respect to a selected way point;

storage means presenting a selected one of a plurality of designated track angles in the form of a multibit group of digital signals;

a counter, the output of which is representative of track angles, said counter being advanced from a zero count to a count relating to maximum track angle during each cyclic period;

means comparing the output of said storage device with the output of said counter and for generating a signal when the outputs thereof are equal;

means responsive to said compare output signal for providing square wave signals at the same frequency as said carrier signals, one of said square wave signals delayed in phase from the sine of said carrier by a designated track angle corresponding to said selected way point, and the other of said square wave signals delayed from the cosine of said carrier signals by said designated track angle;

four synchronous demodulators, a first pair thereof synchronously demodulating respective ones of said coordinate carrier signals in response to one of said square wave signals, the other pair thereof synchronously demodulating respective ones of said coordinate carrier signals in response to the other of said square wave signals; and means for summing the output of each synchronous demodulator with the output of the other synchronous demodulator of the same pair, the outputs of said summing means comprising cross track error and along track distance to the way point.

4. An aircraft navigation computer according to claim 3 wherein said square wave signal generating means includes further means responsive to said compare output signal for generating signals delayed one quarter period, one half period and three quarter periods therefrom for controlling said square wave signal generating means.

* * * * *

UNITED STATES PATENT OFFICE
CERTIFICATE OF CORRECTION

Patent No. 3,778,601    Dated December 11, 1973

Inventor(s) Larry D. Brock and John E. Games

It is certified that error appears in the above-identified patent and that said Letters Patent are hereby corrected as shown below:

Column 3, line 25, change "equal inverted to" to
-- inverted to equal --

Column 3, line 42, change "an" to -- on --

Column 3, line 67, change "illustrates Fig. 3 illustrates" to -- However, Fig. 3 illustrates --

Signed and sealed this 25th day of June 1974.

(SEAL)
Attest:

EDWARD M. FLETCHER, JR.
Attesting Officer

C. MARSHALL DANN
Commissioner of Patents